Jan. 7, 1941.                     G. BINON                    2,227,695
                            DISPENSER FOR LIQUID
                            Filed March 7, 1938
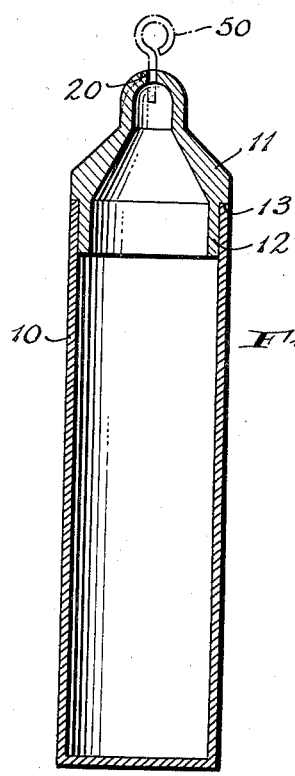
Fig. 1.
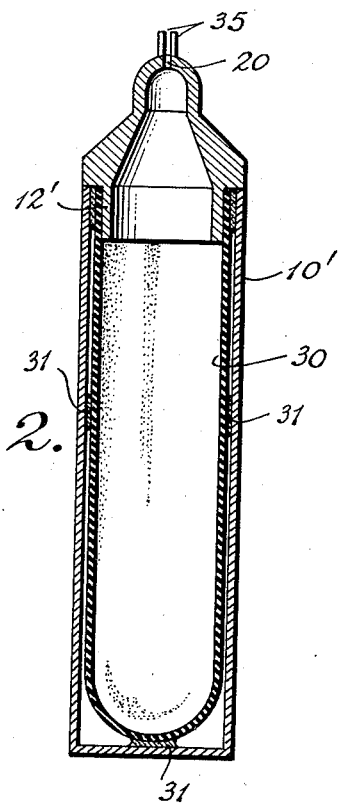
Fig. 2.
Fig. 3.
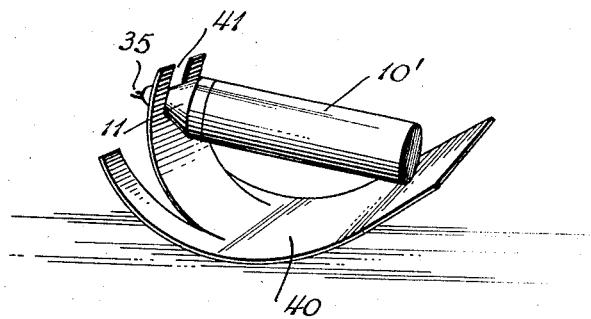
                                              INVENTOR.
                                         GEORGES BINON
                                    BY
                                              ATTORNEY.

Patented Jan. 7, 1941

2,227,695

UNITED STATES PATENT OFFICE 2,227,695

DISPENSER FOR LIQUID

Georges Binon, New York, N. Y., assignor to M. Grumbacher, New York, N. Y., a partnership composed of Walter Grumbacher and Walter J. Grumbacher Application March 7, 1938, Serial No. 194,440
In Belgium March 8, 1937

4 Claims. (Cl. 120—57)

My present invention relates generally to a fluid container constructed and arranged so as to serve effectively for dispensing the fluid contents thereof.

As my invention is intended particularly for dispensing drafting ink into the space between the prongs at the end of a drafting pen, I will illustrate and disclose my invention in that connection and for that purpose.

It is a general object of the invention to provide an improved and simplified container from which fluids, such as drafting ink can be dispensed in measured quantities and without the use of movable parts and without requiring any manipulation of any character, except the positioning of the container so as to permit of a gravity of flow therefrom.

One of the objects of the present invention is to provide a container of the character referred to, from which the required measured quantity of ink and the like will flow into the space between the nibs of the drafting pen, merely by bringing the nibs into predetermined relation to the container with the container positioned so as to permit a gravity flow.

For the attainment of the foregoing objects and such other objects as may hereinafter appear or be pointed out, in the manner illustratively exemplified in the accompanying drawing, wherein:

Figure 1 is a vertical cross section through one embodiment of my invention;

Figure 2 is a section through a modification thereof; and

Figure 3 shows my container associated with a stand.

Before proceeding to describe my invention I will premise that its purpose is a container, an outlet therefrom, all so characterized that a fluid such as drafting ink can be dispensed therefrom directly in between the nibs of a drafting pen and in the quantities required for that purpose, merely by positioning the drafting pen adjacent the element and then tilting the bottle so as to permit of a gravity flow and in Figure 1, I have illustrated such an arrangement wherein the container comprises the body member 10 and the cap 11. The two are associated to form the completed container in any preferred or desired manner as for example by having the body member entirely open at the top and receiving therewithin the reduced neck portion 12 depending from the cap and providing a shoulder 13 which seats itself upon the top wall of the member 10. The body member and the cap member 11 both of which are made of relatively rigid and noncompressible material such as metal or Bakelite, and may be held against disassembly in any preferred or desired manner, as for example by friction.

The cap member 11 is provided centrally thereof and at the top with the opening 20, the dimensions of which form an important feature of my invention because it is by the characteristics of this opening, the characteristics of the container in which it is formed and the fluid contents thereof, that the objects of my invention are attained. For example, I will here state that the container selected for purposes of illustration in Figure 1 has been drawn to dimension, as representing a preferred size and shape. The body member is approximately 3 inches in height and is of a diameter about ¾ of an inch. It is necessary that the opening 20 be capillary in character and taking into consideration the dimensions of the container and the fluid to be dispensed, I find that this capillary action can be effectively attained for purposes of giving the required feed to a fluid such as drafting ink by making this opening 20 approximately 1½ millimeters in width and of as little length as possible and in no event to exceed 3½ millimeters. I have discovered for example, that an opening less than one millimeter or greater than three millimeters or more, impairs the character of the flow as to render it impossible for the attainment of the objects of my invention which in the instant case is that when the container is turned with the opening 20 positioned at the bottom there will be a discharge of ink through the opening 20, however, of only one or two drops and that there will be no further discharge of ink unless the container is again moved back to its vertical position of Figure 1 and from that position of Figure 1 again moved to a position where the opening 20 is at the bottom.

I have further discovered that a factor in controlling the flow of a fluid such as drafting ink from a container such as Figure 1 in the manner above already set forth, is that the container shall not be filled with ink more than to approximately ⅚ and in this connection it will be noted that the body member 10 if filled with a fluid such as ink up to the level of the bottom of the flange 12 will give approximately the desired proportionality of 5 of ink to 1 of air which as already stated, is the factor in the proper flow of ink.

In Figure 2 is shown an embodiment which has all the features of construction and manner of operation disclosed in connection with the embodiment of Figure 1, and some added features. One of these added features is employment of the reservoir 30 made of a soft material such as rubber or the like so as to be collapsible but which is held to the casing body 10' in any preferred or desired manner for example by being secured at the points 31 by a cement or the like. This collapsible tube 30 is supported at the top by being secured between the wall of the casing body 10' and the depending projection or flange 12' in any preferred or desired manner as by clamping operation or by a binder as shown in the drawing. The advantage of the collapsible inner container 30 will slightly increase the discharge of ink with each manipulation of the container as above set forth so that each discharge will give an additional drop or so. This result is due to the tendency of portions of the inner container 30 to collapse and therefore to add this pressure factor to force additional ink out of the container. As stated the parts have been so contrived and related in the bottle of Figure 2 that this additional pressure will be slight and yet sufficient to add just a drop or so to the flow.

The manner of using the embodiment of Figure 1 for discharging in between the nibs of a drafting pen calls among other things for bringing the drafting pen into a position so that the space between the two nibs adjacent the points thereof are in registration with the opening 20. To assist in this operation I show in the embodiment of Figure 2 the elements 35 projecting upwardly from the mouth or opening 20. These elements are sufficiently small and spaced apart just sufficiently so as to enable them to be received between the two prongs of the drafting pen. By this arrangement all that is required is that the two nibs of the drafting pen be brought over the two projections 35 and the container then turned over so as to have the opening below. There will result a feed of the required one or two drops as the case may be.

As can be gathered from the description thus far given, it is assumed that the embodiment of Figures 1 and 2 are turned from one position to another by hand and the contact of the hand with the container introduces a heat factor which may effect the feed from that which has been predetermined. On reference to Figure 3, it will be observed that I there show a stand in the form of a metal stamping 40 in which the container is supported so that any downward pressure upon the end having the discharge opening 20 will cause the container to be swung so as to induce or permit a gravity feed and for this purpose the stamping 40 is shown as curved and provided at one end with a means such as the slot 41 in which the neck of the container is received freely and so dimensioned that when the neck is so received in the slot 41 the bottom of the container will seat itself somewhere on the inner surface of the support 40 as shown in this figure so that the combination permits of an easy rocking motion. It is in the association shown in Figure 3 that the extensions 35 serve the added function in that the rocking motion can be effected by the engagement of the nibs of the drafting pen with these projections and the manipulation downwardly of the drafting pen. In this manner, the container can be used for dispensing ink, without any hand contact therewith.

In order to seal the opening 20 against accidental spilling of the ink when the device is not in use and also against evaporation, I may provide a closure pin 50 such as shown in Figure 1. In order to give sufficient purchase for holding the pin 50 in position by friction or otherwise, it may be advisable to make the opening 20 of a greater height than is absolutely essential for the drop by drop feed.

This may also be accomplished by having an encircling flange extending upwardly from the opening for a small distance so as to give this extension to the opening.

The functioning of my device can be explained in the following manner: When the bottle is reversed, the ink flows in the direction of the opening and will fill the cap member 11 and the weight of the liquid will be sufficient to cause one or more drops to discharge through this opening. However, with the discharge through the opening, the air in the tube will be expanded to a corresponding extent so as to re-establish a balance. I have found that the device will operate sufficiently as above outlined if the amount of ink in the container does not exceed ⅘ or ⅚ of the maximum, and that the air in the container be between ⅙ or ⅕ of the volume thereof.

From the embodiment of Figure 2 it will be observed that the collapsibility of the inner container has been immaterially reduced by causing the container to be supported at spaced points.

In general, it will be understood that changes in the details herein described and illustrated for the purpose of explaining the nature of my invention, may be made by those skilled in the art without departing from the spirit and scope of the invention as expressed in the appended claims. It is, therefore, intended that these details be interpreted as illustrative and not in a limiting sense.

Having thus described my invention and illustrated its use, what I claim as new and desire to secure by Letters Patent, is:

1. A dispenser for drafting ink comprising an elongated body portion and a cap portion adapted to seat on one end thereof so as to form a complete container, a capillary opening in said cap, said opening being the only passage, when the container is in complete assembled form, through which drafting ink can pass out of the container, said container being of elongated tubular conformation and having a length of approximately four inches and a diameter of approximately three fourths of an inch, and the diameter of the capillary opening being between a minimum of one millimeter and a maximum of three millimeters and its length not more than three and one half millimeters whereby when said container is filled with drafting ink to such an extent that it contains from one-fifth to one-sixth its volume of air and inverted, a limited quantity of ink will be discharged through said capillary opening, and projections on said cap adjacent said opening, said projections being adapted to guide the nibs of a drafting pen into registration with said opening.

2. A container for dispensing fluids such as drafting ink, comprising an outer relatively rigid closed casing, and an inner container disposed within said outer casing which tends to collapse under normal conditions, and a capillary outlet through which fluid from said inner container may be discharged.

3. A container for dispensing fluids such as drafting ink, comprising an outer relatively rigid closed casing, and an inner container disposed within said casing which tends to collapse under normal conditions, and a capillary outlet in the walls of said outer casing through which fluid from said inner container may be discharged, and means for reducing the collapsibility of said inner container.

4. A container for dispensing fluids such as drafting ink, comprising an outer relatively rigid closed casing, and an inner container disposed within said casing which tends to collapse under normal conditions, and a capillary outlet in the walls of said outer casing through which fluid from said inner container may be discharged, and means for reducing the collapsibility of said inner container, and projections on said outer casing adjacent said opening, said projections being adapted to guide the nibs of a drafting pen into registration with said opening.

GEORGES BINON.